United States Patent [19]

Aignesberger et al.

[11] Patent Number: 5,035,812
[45] Date of Patent: Jul. 30, 1991

[54] THERMOSTABLE POLYMERS

[75] Inventors: Alois Aignesberger, Trostberg; Josef Weichmann, Pleiskirchen; Johann Plank, Trostberg; Manfred Bichler, Engelsberg, all of Fed. Rep. of Germany

[73] Assignee: SKW Trostberg Aktiengesellschaft, Trostberg, Fed. Rep. of Germany

[21] Appl. No.: 522,505

[22] Filed: May 2, 1990

Related U.S. Application Data

[63] Continuation of Ser. No. 146,311, Jan. 21, 1988, abandoned.

[30] Foreign Application Priority Data

Jan. 21, 1987 [DE] Fed. Rep. of Germany ....... 3701600

[51] Int. Cl.$^5$ ................................................ C09K 7/02
[52] U.S. Cl. .................................. 252/8.51; 252/8.513; 526/264
[58] Field of Search ................. 252/8.51, 8.514, 8.513; 526/264

[56] References Cited

U.S. PATENT DOCUMENTS

| | | | |
|---|---|---|---|
| 2,808,383 | 10/1957 | Fikenischer et al. | 260/29.4 |
| 3,025,234 | 3/1962 | Canterino | 252/8.51 |
| 3,686,150 | 8/1972 | Barabas et al. | 526/264 |
| 4,048,077 | 9/1977 | Engelhardt et al. | 252/8.51 |
| 4,293,427 | 10/1981 | Lucas et al. | 252/8.5 C |
| 4,502,964 | 3/1985 | Giddings et al. | 252/8.5 C |
| 4,502,965 | 3/1985 | Giddings et al. | 252/8.5 C |
| 4,544,722 | 10/1985 | Giddings et al. | 526/264 |
| 4,578,201 | 3/1986 | Burns et al. | 252/8.5 C |
| 4,644,020 | 2/1987 | Stahl | 526/264 X |
| 4,647,637 | 3/1987 | Tschang et al. | 526/264 |
| 4,749,498 | 6/1988 | Lange | 526/264 X |

FOREIGN PATENT DOCUMENTS 3404491 2/1984 Fed. Rep. of Germany .
1111503 5/1968 United Kingdom .

Primary Examiner—Robert L. Stoll
Assistant Examiner—Gary L. Geist
Attorney, Agent, or Firm—Felfe & Lynch

[57] ABSTRACT

The present invention provides a thermostable polymer comprising
a) 16 to 67 mole % of structural components of the formula:

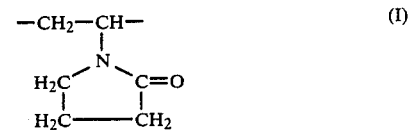

b) 5 to 42 mole % of structural components of the formula:

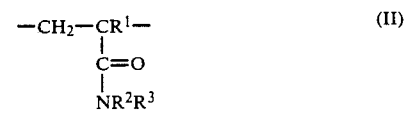

wherein $R^1$, $R^2$ and $R^3$, independently of one another, are hydrogen atoms or methyl radicals, as well as c) 16 to 46 mole % of structural components of the formula:

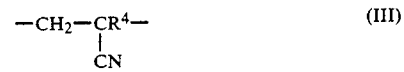

wherein $R^4$ is a hydrogen atom or a methyl radical.

The present invention also provides a process for the production of these polymers which, because of their high temperature stability, are outstandingly useful as retention agents for aqueous systems and as fluid loss additives.

6 Claims, No Drawings

THERMOSTABLE POLYMERS

This is a continuation of application Ser. No. 146,311 filed on Jan. 21, 1988 now abandoned.

The present invention is concerned with thermostable polymers which can be used as retention agents for aqueous systems or as additives for drilling fluids and especially as fluid loss additives.

It is known that water-based drilling fluids, which comprise suspensions of bentonite or clay, contain additives. These include, for example fluid loss additives which, by formation of a thin filter cake, prevent water from filtering out of the drilling fluids into the porous formations being drilled through. The fluid loss additives are to bring about a good filtration control and have a high temperature stability because the temperatures of the drilling fluids increase very considerably with increasing drilling depth due to the heat of the earth and to friction. Furthermore, these additives are to have a good salt compatibility especially towards polyvalent cations, such as calcium and magnesium cations, in order that they do not lose their fluid loss action in the case of drilling through salt deposits.

Of the previously known additives, only a few provide satisfactory results with regard to the totality of the necessary properties. Starch and modified starch admittedly possess a practically unlimited electrolyte compatibility but the thermostability, which is about 120° C., is not sufficient. Cellulose derivatives, such as, for example, carboxymethylcellulose, have a somewhat better thermostability but their salt compatibility is strictly limited. Only synthetic polymeric compounds have good thermal stabilities, this applying especially to acrylamide/acrylate co-polymers.

In water-based drilling fluids, polymers of this type have a good fluid loss control up to and above 200° C. but lose their effectiveness in the case of the admittance of even small amounts of polyvalent cations. The reason for this is probably due to the saponification of the amide groups to acrylate functions which easily takes place in the alkaline drilling fluid media.

Co-polymers based on vinyl sulphonate/vinylamide, for example co-polymers based on acrylamidopropanesulphonic acid (AMPS) which is co-polymerised with, for example, acrylamides (cf. U.S. Pat. No. 4,293,427), with vinylamides and acrylamide (cf. Federal Republic of Germany Patent Specification No. 29 31 997) or with acrylamide and acrylonitrile (cf. U.S. Pat. No. 4,502,964), possess a good action not only with regard to temperature stability but also salt compatibility. Polymers of this type tolerate, as drilling fluid additives, high inflow amounts of calcium and magnesium ions without losing the effectiveness of the fluid loss action.

However, a disadvantage of this group of co-polymers is the fact that, depending upon the difficulty of the fluid to be controlled (calcium content, fluid density), here, too, the practical scope of use is limited by thermal decomposition at temperatures only a little above 200° C.

The use of these fluid loss additives is, in the case of higher temperatures at the bottom of the hole, only conceivable, if at all, in uneconomic amounts.

Finally, U.S. Pat. No. 4,502,965 describes terpolymers which, besides acrylamidopropanesulphonic acid (AMPS), also contain N-vinylpyrrolidone and acrylonitrile. In the case of these products, the temperature stability and salt compatibility is just as limited as in the case of the co-polymers according to U.S. Pat. No. 4,578,201, based upon N-vinyllactams and unsaturated amides.

Therefore, it is an object of the present invention to provide polymers which do not suffer from the above-mentioned disadvantages of the prior art but rather, especially in an aqueous medium, even at high temperatures and salt concentrations, display a good action as drilling fluid additives and are economic to use.

Thus, according to the present invention, there is provided a polymer comprising:

a) 16 to 67 mole % of structural components of the formula:

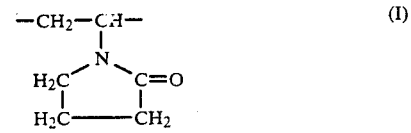

b) 5 to 42 mole % of structural components of the formula:

in which $R^1$, $R^2$ and $R^3$, independently of one another, are hydrogen atoms or methyl radicals, as well as c) 16 to 46 mole % of structural components of the formula:

in which $R^4$ is a hydrogen atom or a methyl radical.

Surprisingly, we have found that the polymers according to the present invention, in comparison with the previously known products, display a better action even at relatively high temperatures and salt concentrations.

The polymers of the present invention are at least partly water-soluble and can be converted by hydrolysis in the water-soluble form if a better water-solubility is desired.

The polymers of the present invention consist of at least three structural components. The first structural component of formula (I) is derived from N-vinylpyrrolidone and is present in a ratio of from 16 to 67 mole %, preferably of from 41 to 57 mole %, referred to the mole sum of the three essential structural components.

The second structural component of formula (II), which is derived from acrylamide and/or methacrylamide, is present in a ratio of from 5 to 42 mole %, preferably of from 13 to 18 mole %. The acrylamide or methacrylamide can be present not only in unsubstituted form but also in mono- or disubstituted form, the substituent being the methyl radical.

The third structural component of formula (III), which is derived from acrylonitrile and/or methacrylonitrile, is, finally, incorporated into the polymer in a ratio of from 16 to 46 mole %, preferably of from 30 to 41 mole %.

Besides these three structural components, which are essential according to the present invention, the polymers according to the present invention can also contain up to 40 mole %, referred to the sum of the three essential structural components, of structural components, the monomers of which have a Q value of from 0.04 to 5. The Q value according to Alfrey and Price represents a measure of the reactivity of the monomer in question for radical polymerisation (cf. in this regard, B. Vollmert "Grundriss der makromolekularen Chemie, Vol. I, p. 154 et seq., 1982, Karlsruhe). Preferred monomers of this group include methyl vinyl ketone, allyl alcohol, acrolein, mesityl oxide, acrylic acid and methacrylic acid and the salts and esters thereof.

Furthermore, the polymers can also contain up to 10 mole % of a conventional cross-linking agent which preferably contains two olefinic double bonds, N,N-methylene-bis-acrylamide and/or isoprene being especially preferred.

The molecular weight of the polymers of the present invention can be varied within wide limits and, depending upon the monomeric compounds and the polymerisation conditions used, can be from 10,000 to 2.0 million.

In the scope of the present invention, the structural components (I), (II) and (III) can be present in wholly or partly hydrolysed form. The hydrolysis of these compounds is carried out in a basic medium, whereby, according to the desired degree of hydrolysis, the bases can be used in stoichiometric or less than stoichiometric amounts. It is also possible to carry out the hydrolysis in the alkaline medium of the system used, for example of a drilling fluid or of a cement slurry.

The production of the polymers according to the present invention takes place in such a manner that 16 to 67 mole % and preferably 41 to 57 mole % of N-vinylpyrrolidone, as well as 5 to 42 mole % and preferably 13 to 18 mole % of an acrylamide and/or methacrylamide and 16 to 46 mole % and preferably 30 to 41 mole % of acrylonitrile and/or methacrylonitrile are polymerised in an aqueous medium with the help of an initiator at a temperature of from 20° to 200° C. and preferably of from 50° to 100° C.

The acrylamide and/or methacrylamide can be used in unsubstituted form or in mono- or disubstituted form, the substituent being the methyl radical.

If desired, up to 40 mole % of a further monomer with a Q value of 0.04 to 5 can be added to the mixture of N-vinylpyrrolidone, acrylamide and/or methacrylamide and acrylonitrile and/or methacrylonitrile. As monomers, there have hereby proved to be especially useful methyl vinyl ketone, allyl alcohol, acrolein, mesityl oxide, acrylic acid and methacrylic acid and the salts and esters thereof.

The concentration of the aqueous solution can be varied within relatively wide limits but it has proved to be preferable to adjust a solids concentration of from 10 to 70% by weight and more preferably of from 30 to 50% by weight.

As initiators, there can be used all compounds conventionally used for this purpose, for example azoisobutyronitrile (AIBN) or dibenzoyl peroxide, in an amount of from 0.1 to 5% by weight, referred to the weight of the reaction solution.

After the polymerisation reaction, which is usually finished after 1 to 2 hours, if desired, a hydrolysis reaction can be carried out. For this purpose, there can be used the conventional bases at a temperature of from 50° to 100° C. and preferably of from 60° to 80° C., the amount of base used depending upon the desired degree of hydrolysis.

As conventional bases, there are preferably used alkali metal, alkaline earth metal and ammonium salts but, in principle, other basically acting compounds can also be used which bring about the hydrolysis.

After conclusion of the polymerisation reaction or of the hydrolysis, the polymer is usually present as an approximately 10 to 30% aqueous solution and can be used in this form directly as a fluid loss additive or as a retention agent. However, the solution can also be dehydrated with conventional processes and apparatus so that the polymer is obtained as a solid material without any losses being ascertainable with regard to the properties thereof. The mole percentage composition of the polymer corresponds practically to the amounts of monomer used since, after the polymerisation, monomers can only be detected in trace amounts.

The polymers according to the present invention are outstandingly suitable as retention agents for aqueous systems. As aqueous systems in the meaning of the present invention, there are to be understood, for example, cement slurries, mortars, concrete and the like. Furthermore, the polymers can be used for aqueous clay suspensions, for example in the form of drilling fluids, in which case bentonite or attapulgite are especially preferred as clays.

The polymers according to the present invention can be used in drilling fluids as so-called fluid loss additives preferably in an amount of from 0.3 to 5% by weight, referred to the weight of the drilling fluid, and possess, depending upon the composition of the fluid, a temperature stability of up to at least 250° C. The salt compatibility of these polymers is also outstanding. In particular, the compatibility with divalent cations, such as calcium ions, is extraordinary.

Finally, the polymers according to the present invention also display in aqueous solutions, which only contain little or no suspended solids, a good retention action. This action is called for especially in the case of so-called completion fluids which are used in the oil industry for example in the form of solutions of sodium chloride, calcium chloride or calcium/zinc bromide. The amount in the case of the use as retention agents is, depending upon the intended use, from 0.1 to 10% by weight, referred to the aqueous system.

The following Examples are given for the purpose of illustrating the present invention:

EXAMPLE 1 (PRODUCTION)

Components a) 20.8 g. acrylonitrile
b) 65.3 g. N-vinylpyrrolidone
c) 13.9 g. acrylamide
d) 150 g. water
e) 0.30 g. azoisobutyronitrile, dissolved in 20 ml. methanol The components a), b), c) and d) are placed in a reaction vessel and nitrogen is passed through the solution for about 30 minutes.

Subsequently, component e) is added thereto, followed by heating. At about 65° C., the slightly exothermic reaction commences. During the polymerisation reaction the solution becomes increasingly more viscous. In order to ensure that the reaction mixture remains readily stirrable, it is successively diluted with about 450 ml. of water, in each case about 20 to 50 ml. of water being added. After expiry of the reaction period of about 45 to 60 minutes, the reaction solution is further stirred at 80° to 85° C. for about 1 hour. The colourless solution obtained has a solids content of 10 to 20% by weight and a viscosity of 5000 to 25,000 mPa.s.

EXAMPLE 2 (PRODUCTION)

Components a) 26.5 g. acrylonitrile
b) 22.2 g. N-vinylpyrrolidone
c) 35.5 g. acrylamide
d) 126 g. water
e) 0.25 g. azoisobutyronitrile, dissolved in 20 ml. methanol
f) 1.70 g. sodium hydroxide (17 ml. of a 10% aqueous solution)

The components a), b), c) and d) are placed in a reaction vessel. After passing nitrogen therethrough for 30 minutes, component e) is added thereto and the mixture is heated. The reaction commences at about 60° C. with a distinct increase of the viscosity. The reaction mixture is kept at 80° to 90° C. for 1 hour and diluted stepwise with a total of about 350 ml. of water.

A turbid, milky white polymer is obtained with a solids content of 10 to 20% and a viscosity of 2000 to 40,000 mPa.s which can be used in this form as a fluid loss additive.

In order to obtain a clear solution, it is thermally after-treated with component f), as well as 100 ml. of water, for about 30 minutes at 80° C.

EXAMPLE 3 (PRODUCTION)

Components a) 208 g. acrylonitrile
b) 653 g. N-vinylpyrrolidone
c) 139 g. acrylamide
d) 76 g. allyl alcohol
e) 1500 g. water
f) 5.9 g. dibenzoyl peroxide Components a) to e) are placed in a reaction vessel and nitrogen is passed through for 30 minutes, while stirring. Subsequently, component f) is added thereto and the mixture is heated. The exothermic reaction commences at about 60° to 70° C. and results in an increase of the viscosity. The reaction mixture is kept at 80° to 90° C. for 1 hour and diluted stepwise with about 1250 ml. of water.

A milky white polymer is obtained with a solids content of 25 to 30% and a viscosity of 1000 to 10,000 mPa.s.

EXAMPLE 4 (PRODUCTION)

Components a) 208 g. acrylonitrile
b) 653 g. N-vinylpyrrolidone
c) 139 g. acrylamide
d) 277 g. sodium acrylate, dissolved in 385 ml. water
e) 1115 g. water
f) 3.8 g. azoisobutyronitrile, in 80 ml. methanol Components a) to e) are placed in a reaction vessel. After passing through nitrogen for 30 minutes, while stirring, component f) is added thereto and the reaction mixture is heated. It is maintained for 1 hour at 80° to 90° C. and thereby diluted stepwise with a total of about 6000 ml. of water.

A clear polymer is obtained with a solids content of 10 to 15% and a viscosity of 1000 to 10,000 mPa.s.

EXAMPLES 5 to TO 7 (USE AS FLUID LOSS ADDITIVE)

In order to demonstrate the advantageous action of the polymers according to the present invention, the polymer of Example 1 is subjected to the following test process according to API RP 13 B (11th edition of 1.5.1981, p. 9 et seq.):

Test A: API fluid loss test: filtration experiment at ambient temperature and 7 bar differential pressure Test B: high pressure-high temperature (HPHT) filtration experiment at 35 bar and 233° C. (450° F.), in each case after 24 hours dynamic aging of the fluid in a so-called "roller oven".

In the case of both filtration experiments, in each case there are given the volume values in ml. of the drilling fluid liquid emerging from the test cell. This amount should be as small as possible.

In order to investigate the effect of, different electrolytes, various drilling fluids are used with varying salt contents:

fluid I: 4% bentonite suspension
fluid II: 4% bentonite suspension + 25% by weight sodium chloride + 1% by weight calcium sulphate hemihydrate
fluid III: 4% bentonite suspension + 10% by weight sodium chloride + 10% by weight calcium chloride
fluid IV: 4% bentonite suspension + 4% by weight of sea salt
fluid V: 4% bentonite suspension + 26% by weight sodium chloride + 5% by weight Rev-Dust + 420 g./liter barium sulphate.

Because of its high calcium content, fluid III represents by far the highest demands on the fluid loss additive.

EXAMPLE 5

Filtrate values according to Test A at ambient temperature and 2% by weight dosing, referred to the solids content of the polymer solution according to Example 1 in fluids I to IV.

I: 5.4 ml.
II: 3.5 ml.
III: 3.7 ml.
IV: 5.8 ml.

At ambient temperature, the polymer according to the present invention displays a good filtrate reduction (blank value for fluid III without additive: about 90 ml. of filtrate).

EXAMPLE 6

Determination of the filtrate values after 24 hours ageing of the fluids at 233° C. (450° F.) and 3% by weight dosing, referred to the solids content of the polymer solution of Example 1:

| (a) | Test A | | Test B |
|---|---|---|---|
| I | 4.2 ml. | I | 28 ml. |
| II | 2.4 ml. | II | 22 ml. |
| III | 2.3 ml. | III | 40 ml. |
| IV | 3.8 ml. | IV | 36 ml. |

The filtrate values of fluid III show, in particular, that the polymer according to the present invention, even after thermal stressing at 233° C., is able to keep under good control the fluid loss of drilling fluids containing electrolytes.

| (b) | Test A | | Test B |
| --- | --- | --- | --- |
| III | 1.1 ml. | III | 20 ml. |

A polymer is here used which has been produced according to Example 1 but with an initiator concentration of 0.45 g.

EXAMPLE 7

Filtrate values according to Test A in fluid V after 24 hours ageing in a roller oven at 220° C. and 3% by weight dosing referred to the solids content of the polymer solutions produced according to Examples 1 to 4:

| polymer according to Example | filtrate value in ml. |
| --- | --- |
| 1 | 5.7 |
| 2 | 6.2 |
| 3 | 8.1 |
| 4 | 6.8 |

EXAMPLES 8 TO 10 (USE AS RETENTION AGENT)

Example 8

This Example explains the useability of the product according to the present invention produced according to Example 2 as retention agent for oil well cement slurries which contain a comparatively large amount of calcium salt.

According to the procedure of API Specification 10 (edition of January, 1982), a cement slurry is produced from:
792 g. oil well cement of API Class G
303 g. water
15.8 g. calcium chloride hexahydrate
7.92 g. naphthalenesulphonic acid-formaldehyde dispersant
52.8 g. of a 15% solution of the hydrolysed polymer produced according to Example 2.

In the case of the mixing up, the water is first mixed with the polymer solution and a dry mixture of cement, calcium chloride and the naphthalenesulphonic acid-formaldehyde dispersant added thereto.

The so mixed cement slurry is stirred for 20 minutes in an atmospheric consistometer at 25° C. and the filtrate loss subsequently determined at 1000 psi pressure according to the procedure of API Spec. 10.

The slurry displays a very low water loss of 28 ml. after 30 minutes.

EXAMPLE 9

This Example demonstrates the useability of the product according to the present invention produced according to Example 2 as retention agent for salt solutions such as are used, for example, as so-called work-over and completion fluids in the oil industry.

A completion fluid which contains 30% calcium chloride is prepared from:
148 g. water
117 g. calcium chloride
50 g. calcium carbonate powder
100 g. of a 15% polymer solution prepared according to Example 2 without alkaline hydrolysis.

At ambient temperature, this suspension displays an API water loss of 4.8 ml., determined with 7 bar overpressure, according to API RP 13 B, 1981 edition.

For testing the retention action of the polymer under thermal stressing, the above completion fluid is filled into an ageing cell, tightly closed and stored statically for 24 hours at 200° C.

After the ageing, it is cooled to ambient temperature and the API water loss again determined at 7 bar. There is found 3.6 ml. The HTHP water loss, determined with 500 psi pressure difference, of this sample aged at 200° C. is 10 ml. at 180° C.

This Example shows that the polymer according to the present invention still satisfactorily reduces the water loss of highly calcium-containing solutions even after drastic thermal stressing.

EXAMPLE 10

The polymer solutions produced according to Examples 1 and 2 can be used for the preparation of mortars or cement paste with a high water retention ability, for example for aerated concrete adhesives.

The aerated concrete is so firmly adhered by the cement glue that after 24 hours breakage of the joint no longer occurs.

The same result is achieved with powdered products which have been produced according to conventional methods, for example spray or drum drying, from polymer solutions, thermally treated for 15 hours at 230° C. in a drying box and subsequently added to the cement glue as retention agent.

We claim:

1. A method for preventing water loss in aqueous systems which comprises adding to the system from about 0.1 to about 10% by weight of a polymer having a molecular weight of from 10,000 to 2,000,000 and consisting essentially of 41 to 57 mole % of structural components of the formula $$-CH_2-CH- \atop \underset{H_2C-CH_2}{\overset{H_2C\diagdown\phantom{N}\diagup C=O}{N}} \quad (I)$$

13 to 18 mole % of structural components of the formula $$-CH_2-CR^1- \atop \underset{NR^2R^3}{\overset{C=O}{|}} \quad (II)$$

wherein $R^1$, $R^2$ and $R^3$, independently of one another, are hydrogen or methyl, and 30 to 41 mole % of structural components of the formula $$-CH_2-CR^4- \atop CN$$

wherein $R^4$ is hydrogen or methyl.

2. A method according to claim 1, in which the polymer additionally contains up to 16 mole %, referred to the sum of the structural components I, II and III, of structural components whose monomers are selected from the group consisting of methyl vinyl ketone, allyl alcohol, acrolein, acrylic acid, methacrylic acid, their salts and esters.

3. A method according to claim 1, in which the polymer additionally contains up to 10 mole %, referred to the sum of the structural components I, II and III, of radicals of an N,N-methylene-bis-acrylamide and/or of isoprene as cross-linking agents.

4. A method for preventing fluid loss in water based drilling fluids which comprises adding to said drilling fluid from about 0.3 to 5 weight % of a polymer having a molecular weight of from 10,000 to 2,000,000 and consisting essentially of 41 to 57 mole % of structural components of the formula

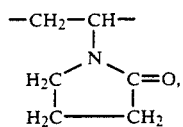 (I)

13 to 18 mole % of structural components of the formula

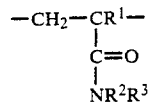 (II)

wherein $R^1$, $R^2$ and $R^3$, independently of one another, are hydrogen or methyl, and 30 to 41 mole % of structural components of the formula

 (III)

wherein $R^4$ is hydrogen or methyl.

5. A method according to claim 4, in which the polymer additionally contains up to 16 mole %, referred to the sum of the structural components I, II and II, of structural components whose monomers are selected from the group consisting of methyl vinyl ketone, allyl alcohol, acrolein, acrylic acid, methacrylic acid, their salts and esters.

6. A method according to claim 4, in which the polymer additionally contains up to 10 mole %, referred to the sum of the structural components I, II and III, of radicals of an N,N-methylene-bis-acrylamide and/or of isoprene as cross-linking agents.

* * * * *